US012623709B2

(12) United States Patent (10) Patent No.: US 12,623,709 B2
Gower et al. (45) Date of Patent: May 12, 2026

(54) RECONFIGURABLE BUGGY

(71) Applicant: PHIL AND TEDS DESIGN LIMITED, Wellington (NZ)

(72) Inventors: Campbell Douglas Gower, Wellington (NZ); Philip John Bracen, Wellington (NZ)

(73) Assignee: PHIL AND TEDS DESIGN LIMITED, Wellington (NZ)

( * ) Notice: Subject to any disclaimer, the term of this patent is extended or adjusted under 35 U.S.C. 154(b) by 276 days.

(21) Appl. No.: 18/565,788

(22) PCT Filed: Jun. 9, 2022

(86) PCT No.: PCT/NZ2022/050072
§ 371 (c)(1),
(2) Date: Nov. 30, 2023

(87) PCT Pub. No.: WO2022/265522
PCT Pub. Date: Dec. 22, 2022

(65) Prior Publication Data
US 2024/0246592 A1     Jul. 25, 2024

(30) Foreign Application Priority Data
Jun. 15, 2021    (NZ) ........................................ 777205

(51) Int. Cl.
*B62B 7/00* (2006.01)
*B62B 9/12* (2006.01)
(52) U.S. Cl.
CPC ................ *B62B 7/008* (2013.01); *B62B 9/12* (2013.01); *B62B 2205/104* (2013.01)
(58) Field of Classification Search
CPC ..... B62B 7/008; B62B 9/12; B62B 2205/104; B62B 2205/10; B62B 2207/02; B62B 2207/00
See application file for complete search history.

(56) References Cited

U.S. PATENT DOCUMENTS 6,938,906 B1 9/2005 Black
7,481,439 B2 * 1/2009 Thompson ................ B62B 9/14
280/47.38

(Continued)

FOREIGN PATENT DOCUMENTS

CN     201405903 Y    2/2010
ES        2253093 A1 * 5/2006  ............. B62B 9/102

(Continued)

OTHER PUBLICATIONS

International Search Report and Written Opinion for PCT/NZ2022/050072 issued from the Australian Patent Office on Aug. 17, 2022.

*Primary Examiner* — Steve Clemmons
(74) *Attorney, Agent, or Firm* — Christopher M. Scherer; Godfrey & Kahn S.C.

(57) ABSTRACT

Reconfigurable buggies are described, designed to releasably connect two individual buggies to form one in-line tandem buggy. Methods of coupling and uncoupling are also described along with a connection detail kit that a consumer may look to purchase separately to a buggy or buggies. In one aspect, the buggies are releasably coupled via a connection detail so that the first buggy is linked ahead of the second buggy via the connection detail to form an in-line tandem buggy. An advantage of the above may include versatility to the consumer allowing them to purchase individual buggies and separately a connection detail. This means the consumer may use the two buggies individually or combined together and operable by one person.

15 Claims, 11 Drawing Sheets

(56) References Cited

U.S. PATENT DOCUMENTS

| | | | | | |
|---|---|---|---|---|---|
| 7,597,332 | B2 * | 10/2009 | Thompson | ................ | B62B 7/00 |
| | | | | | 280/47.38 |
| 7,896,384 | B2 * | 3/2011 | Schonfeld | ................ | B62B 7/12 |
| | | | | | 280/47.38 |
| 8,500,139 | B1 * | 8/2013 | Andrews | ................ | B62K 3/002 |
| | | | | | 280/87.051 |
| 11,220,282 | B2 * | 1/2022 | Chaudeurge | ........... | B62B 9/082 |
| 2008/0122200 | A1 | 5/2008 | Lake | | |
| 2010/0072731 | A1 | 3/2010 | Thompson | | |
| 2010/0301585 | A1 | 12/2010 | Katz et al. | | |
| 2013/0187363 | A1 | 7/2013 | Andrews et al. | | |

FOREIGN PATENT DOCUMENTS

| | | | | | |
|---|---|---|---|---|---|
| KR | 200480552 | Y1 * | 6/2016 | .............. | B62B 7/12 |
| WO | WO-2007033562 | A1 * | 3/2007 | .............. | B62B 7/12 |

* cited by examiner

RECONFIGURABLE BUGGY

RELATED APPLICATIONS

The present application is the U.S. National Stage application of International Application No PCT/NZ2022/050072, filed Jun. 6, 2022, which International Application was published on Dec. 22, 2022, as International Publication No. WO2022/265522. The International Application claims priority to New Zealand Patent Application No. 777205, filed Jun. 15, 2021, the contents of which are incorporated herein by reference in their entireties.

TECHNICAL FIELD

Broadly described herein is reconfigurable buggy. More specifically, a system and method are described to releasably link two buggies together in a series configuration.

BACKGROUND ART

Existing strollers are often manufactured to convey one child. Single buggies to convey two children may be side by side, this configuration being a wide configuration. So-called 'inline' configurations also exist where the child seats are on a single buggy, one seat behind the other seat.

One option to link an accessory to a buggy is described in U.S. Pat. No. 10,683,025. The accessory is described in this patent as being a chassis with wheels. The chassis cannot be used to convey a child on its own and requires connection to a buggy via a specific connection mechanism to be used. The connection mechanism is described as having extending male members mating with female openings in the frame legs sides. When the accessory is connected to the buggy, a pivot axis is defined by the connection point that allows the accessory to rotate about the connection in a vertical plane.

An alternative linking mechanism is described in U.S. Pat. No. 8,657,303. In this case, the linking mechanism is used to link a scooter to the rear of a buggy via a linking mechanism using interlinking male pins and female openings that cooperate about a vertical plane to releasably connect the scooter and buggy.

A variation to the above is described in US 2020/0223469. In this patent publication, the accessory is a seat on a chassis and with two rear wheels. The accessory cannot be used alone and in fact folds up when not in use for ease of carriage. The accessory is connected to a buggy via the connection mechanism described in U.S. Pat. No. 10,683,025. Critical to the design is a transfer of braking so that, when the brakes are applied by a user to the accessory, the accessory communicates this to the buggy and the buggy brakes are then actuated. The accessory itself has no braking capability.

A problem in the art relates to how two separate buggies may be used separately or releasably linked together in a series configuration. Existing double buggies cannot be detached into two single buggies. The solutions of U.S. Pat. No. 10,683,025 and US 2020/0223469 are not two separate buggies' linked together and have a lower value to the purchaser since the accessory can only be used when in the use configuration. The accessory cannot be used alone meaning an extra item and expense to the purchaser.

A common scenario for a growing family is that a consumer may purchase a first buggy for their first child and then, when a second child arrives, the parents are faced with decision on whether to purchase double buggies, two separate buggies or an accessory. Sometimes this might mean purchase of a further first buggy as well. It may be useful to be able link two separate buggies together but also use either buggy separately on their own or at least provide the public with a choice.

Further aspects and advantages of the reconfigurable buggy will become apparent from the ensuing description that is given by way of example only.

SUMMARY

Described herein are reconfigurable buggies, more specifically the ability to releasably connect two individual buggies to form one in-line tandem buggy. Methods of coupling and uncoupling are also described along with a connection detail kit that a consumer may look to purchase separately to a buggy or buggies.

In a first aspect, there is provided an in-line tandem buggy configured for carriage of two or more child seats, the in-line tandem buggy comprising:

a first buggy configured for use alone to convey at least one child seat;

a second buggy configured for use alone to convey at least one child seat; and a connection detail;

wherein the first and second buggies are releasably coupled together via the connection detail so that the first buggy is linked ahead of the second buggy via the connection detail and the resulting coupled first and second buggies, combine to form the in-line tandem buggy.

In a second aspect, there is provided a method of coupling a first buggy and a second buggy to form an in-line tandem buggy by:

providing a first buggy, a second buggy and a connection detail, the connection detail configured to releasably couple together a first buggy ahead of a second buggy via the connection detail to form an in-line tandem buggy; and coupling the first buggy and the second buggy together via the connection detail so as to form the in-line tandem buggy.

In a third aspect, there is provided a method of un-coupling an in-line tandem buggy to a first buggy configuration and a second buggy configuration by:

providing a first buggy, a second buggy and a connection detail coupled together to form an in-line tandem buggy, the connection detail configured to releasably couple together the first buggy ahead of the second buggy via the connection detail to form the in-line tandem buggy; and un-coupling the connection detail so as to separate the in-line tandem buggy into the first buggy, the second buggy and the connection detail.

In a fourth aspect, there is provided a kit configured to couple two buggies together to form an in-line tandem buggy, the kit comprising:

a connection detail configured to releasably couple together a first buggy ahead of a second buggy via the connection detail to form an in-line tandem buggy; and a set of instructions.

An advantage of the above may include versatility to the consumer allowing them to purchase individual buggies and separately a connection detail. This means the consumer may use the two buggies individually or combined together and operable by one person.

BRIEF DESCRIPTION OF THE DRAWINGS

Further aspects of the reconfigurable buggy will become apparent from the following description that is given by way of example only and with reference to the accompanying drawings in which.

DETAILED DESCRIPTION

Figure 1:
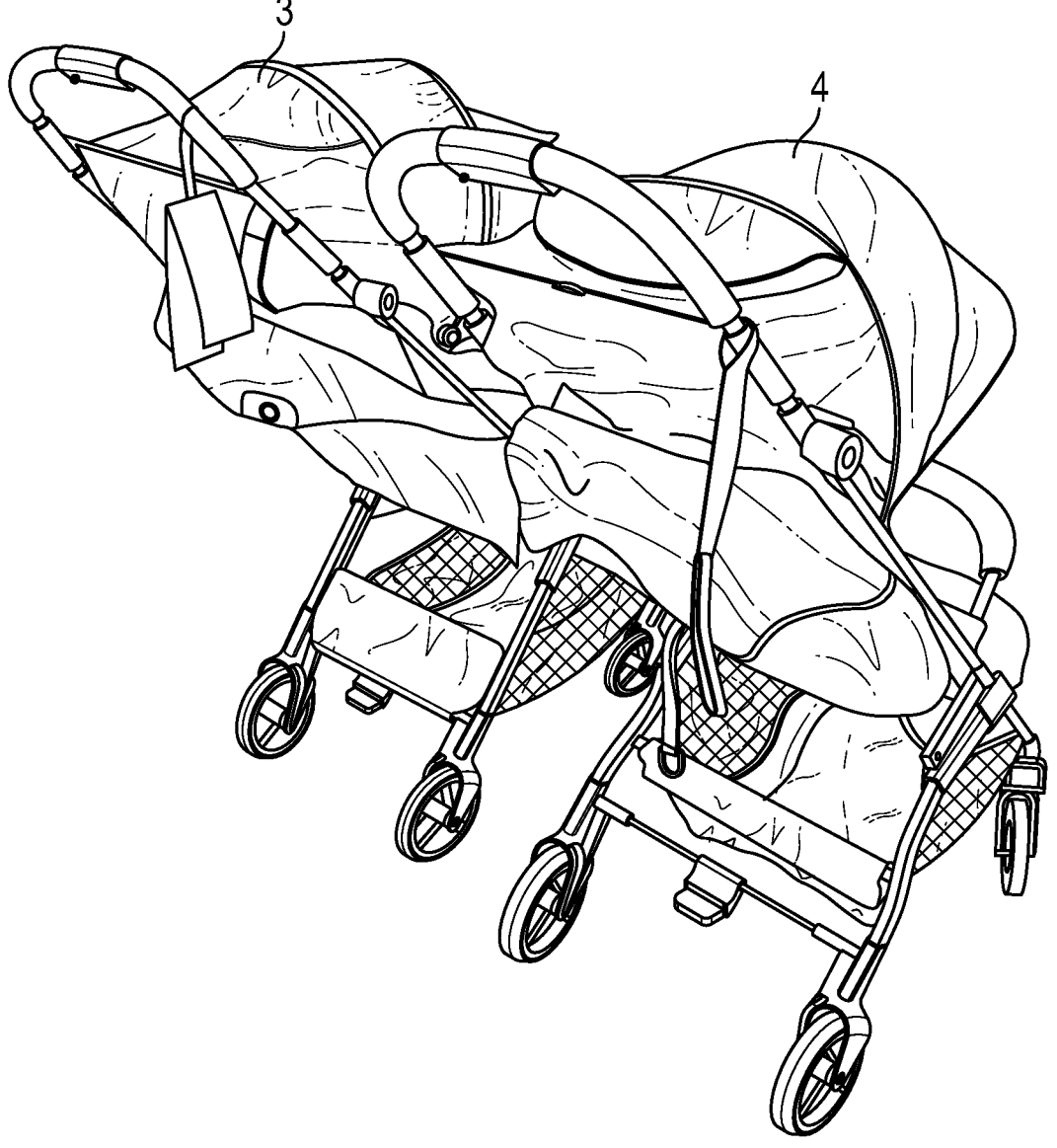
FIG. 1 illustrates an image of a first and second buggy detached and usable as separate individual buggies.
Figure 2:
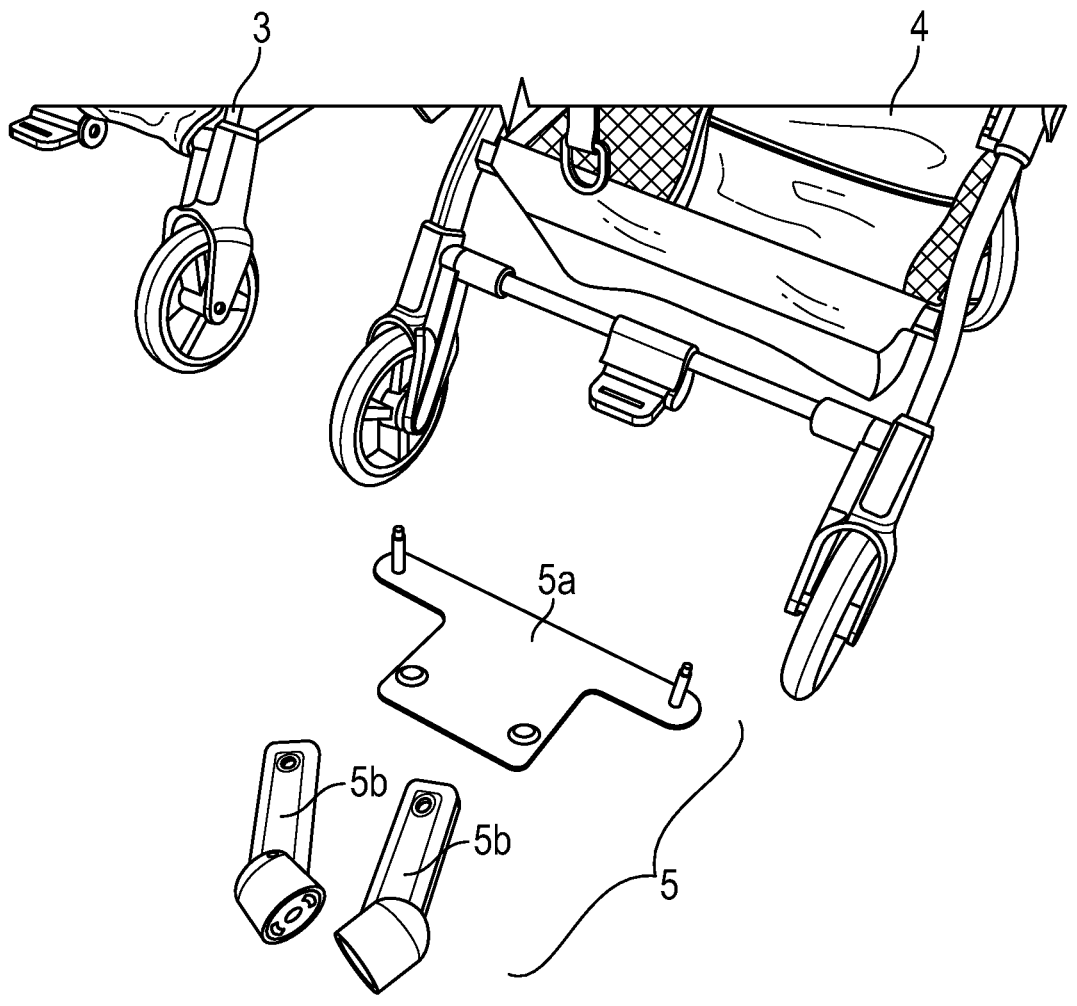
FIG. 2 illustrates the rear of a second buggy and two components in one embodiment of the connection detail.

As noted above, described herein are reconfigurable buggies, more specifically the ability to releasably connect two individual buggies to form one in-line tandem buggy. Methods of coupling and uncoupling are also described along with a connection detail kit that a consumer may look to purchase separately to a buggy or buggies.

For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'substantially' or grammatical variations thereof refers to at least about 50%, for example 75%, 85%, 95% or 98%.

The term 'comprise' and grammatical variations thereof shall have an inclusive meaning—i.e. that it will be taken to mean an inclusion of not only the listed components it directly references, but also other non-specified components or elements.

For the purposes of this specification, the terms 'child buggy', 'buggy', 'perambulator' and grammatical variations thereof collectively and interchangeably refer to child carrying and supporting products used to transport one or more children. The child/children may be babies or toddlers.

In a first aspect, there is provided an in-line tandem buggy configured for carriage of two or more child seats, the in-line tandem buggy comprising:

a first buggy configured for use alone to convey at least one child seat;

a second buggy configured for use alone to convey at least one child seat; and a connection detail;

wherein the first and second buggies are releasably coupled together via the connection detail so that the first buggy is linked ahead of the second buggy via the connection detail and the resulting coupled first and second buggies, combine to form the in-line tandem buggy.

The first and second buggies, when combined, may form a train, one buggy ahead of the other buggy to form the in-line tandem buggy.

The first and second buggies, when combined, or the in-line tandem buggy may move or moves as one unit. Once coupled to an in-line tandem buggy, the first and second buggies cannot move independently and a force applied to the rear of the in-line tandem buggy, e.g. on the second buggy handle, causes transfer of the force to the first buggy in the in-line tandem buggy so the in-line tandem buggy moves as one item. For example, if a turning force is applied to the rear of the in-line tandem buggy, the whole in-line tandem buggy turns. Similarly, if a forwards of backwards motion force is applied to a part of the in-line tandem buggy, the whole in-line tandem buggy moves as one in response to the forwards or rearwards motion force. A force transferred from one part of the in-line tandem buggy may be directly transferred across the in-line tandem buggy—that is, there is no indirect or variable linkage between the first and second buggies once coupled.

The first or second buggy may comprise one or two child conveying seats. When the first or second buggy individually comprises two seats, the seats may be side by side or one behind the other (in-line).

The first and second buggies may be configured for use on their own in an un-linked manner. They may be purchased and used as individual buggies.

The connection detail may couple a rear of the first buggy to a front of the second buggy.

The connection detail may comprise a plate with connection members at either end of the plate and, wherein the connection members on one end of the plate couple to the first buggy and, connection members on an opposing end of the plate couple to the second buggy.

Once coupled, the in-line tandem buggy may be braked by use of brakes on the second buggy. The brake mechanism of the second or rear buggy in the in-line tandem buggy configuration may be disconnected from the second buggy. As a result, braking of the in-line tandem buggy occurs using the brake mechanism on the first or front buggy. This may be a park or foot brake located about the rear base of the first buggy. In this embodiment, the park brake is accessed from the side of the in-line tandem buggy. There is no link between a brake or brakes on the first and second buggies when in an in-line tandem buggy configuration. That is, actuation of the brake(s) of the rear or second buggy in the in-line tandem buggy configuration does not cause any braking of the first buggy or first buggy brake(s).

In one embodiment, the connection detail may comprise:

a base section having a first end that engages at least one frame member on the first buggy and a second end that receives at least one second buggy linking member;

wherein the first end of the base section mates with a fixing section about the at least one frame member of the first buggy; and wherein the second end of the base section mates with a plate cover section and which contains there between a further plate;

wherein the second end of the base section, plate cover section and plate have at least one aperture there-between into which the second buggy connection members are inserted and retained therein.

Optionally, in the connection detail above, the further plate and the second buggy connection members may engage together to retain the second buggy connection member(s) within the aperture(s).

The plate may engage one or more apertures on the second buggy linking members.

In one embodiment the aperture may be a continuous channel around the circumference of one or more rod shaped second buggy connection members.

In one embodiment, the further plate may be movable in a horizontal plane relative to the second end of the base section and plate cover section from a second buggy connection member engaged position to a non-engaged position.

Movement of the further plate relative to the base section may be urged via an actuator.

In one specific embodiment, two actuators, optionally being push buttons, may be used, located on either side of the further plate.

In one embodiment the linking mechanism may include a bias means that biases the further plate to an engaged position that retains the second buggy connection member or members in the aperture or apertures of the base section.

The bias means may be a spring.

Other variations in connection detail may be employed such as those outlined in U.S. Pat. No. 8,657,303 incorporated herein by reference.

Optionally, the rear strut of the second buggy may be removed and replaced with leg extensions and additional wheels. Increasing the height of the rear of the second buggy when in the in-line tandem buggy configuration may be useful to level the second buggy relative to the first buggy since the front of the second buggy when fitted to the rear of the first buggy may also be lifted slightly relative to the original second buggy height above the ground.

In a second aspect, there is provided a method of coupling a first buggy and a second buggy to form an in-line tandem buggy by:

providing a first buggy, a second buggy and a connection detail, the connection detail configured to releasably couple together a first buggy ahead of a second buggy via the connection detail to form an in-line tandem buggy; and coupling the first buggy and the second buggy together via the connection detail so as to form the in-line tandem buggy.

In a third aspect, there is provided a method of un-coupling an in-line tandem buggy to a first buggy configuration and a second buggy configuration by:

providing a first buggy, a second buggy and a connection detail coupled together to form an in-line tandem buggy, the connection detail configured to releasably couple together the first buggy ahead of the second buggy via the connection detail to form the in-line tandem buggy; and un-coupling the connection detail so as to separate the in-line tandem buggy into the first buggy, the second buggy and the connection detail.

In a fourth aspect, there is provided a kit configured to couple two buggies together to form an in-line tandem buggy, the kit comprising:

a connection detail configured to releasably couple together a first buggy ahead of a second buggy via the connection detail to form an in-line tandem buggy; and a set of instructions.

An advantage of the above may include versatility to the consumer allowing them to purchase individual buggies and separately a connection detail. This means the consumer may use the two buggies individually or combined together and operable by one person.

The embodiments described above may also be said broadly to consist in the parts, elements and features referred to or indicated in the specification of the application, individually or collectively, and any or all combinations of any two or more said parts, elements or features.

Further, where specific integers are mentioned herein which have known equivalents in the art to which the embodiments relate, such known equivalents are deemed to be incorporated herein as if individually set forth.

WORKING EXAMPLES

The above described reconfigurable buggy is now described by reference to specific examples.

Example 1

An embodiment of the in-line tandem buggy and separate buggies and connection detail is now described with reference to FIGS. 1 to 11.

Figure 10:
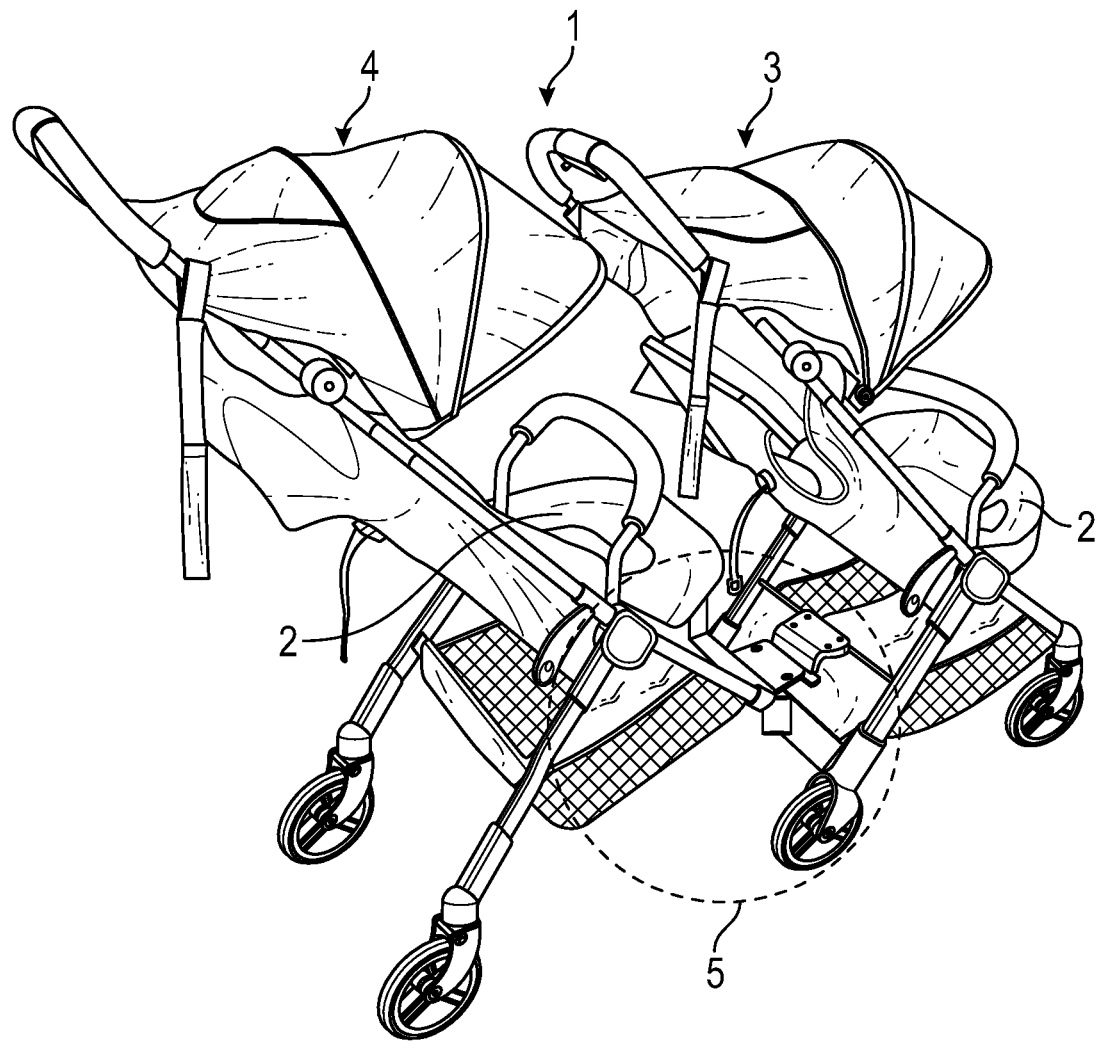
FIG. 10 illustrates a rear perspective view of the in-line tandem buggy.
Figure 11:
FIG. 11 illustrates a front perspective view of the in-line tandem buggy.

FIG. 1 shows a first buggy 3 and second buggy 4 in their separate configurations. Both buggies 3, 4 are independent and fully operational as individual buggies 3, 4. By contrast, FIG. 10 and FIG. 11 show the in-line tandem buggy 1 comprising the first buggy 3 and second buggy 4 linked together via a connection detail 5. Common to the first buggy 3, second buggy 4 and in-line tandem buggy 1 are child seats 2. In this example, each individual buggy 3, 4 has a single seat 2 and the in-line tandem buggy has two seats 2. As may be appreciated, the seats 2 could be replaced with a bassinet (not shown). Side by side or in-line seat buggies may also be used as the first buggy 3, second buggy 4 or both buggies 3, 4. Once connected as the in-line tandem buggy shown in FIG. 10 and FIG. 11, the individual buggies 3, 4 operate in unison so that a person pushing the rear frame handhold rives motion of the whole in-line tandem buggy 1.

Figure 3:
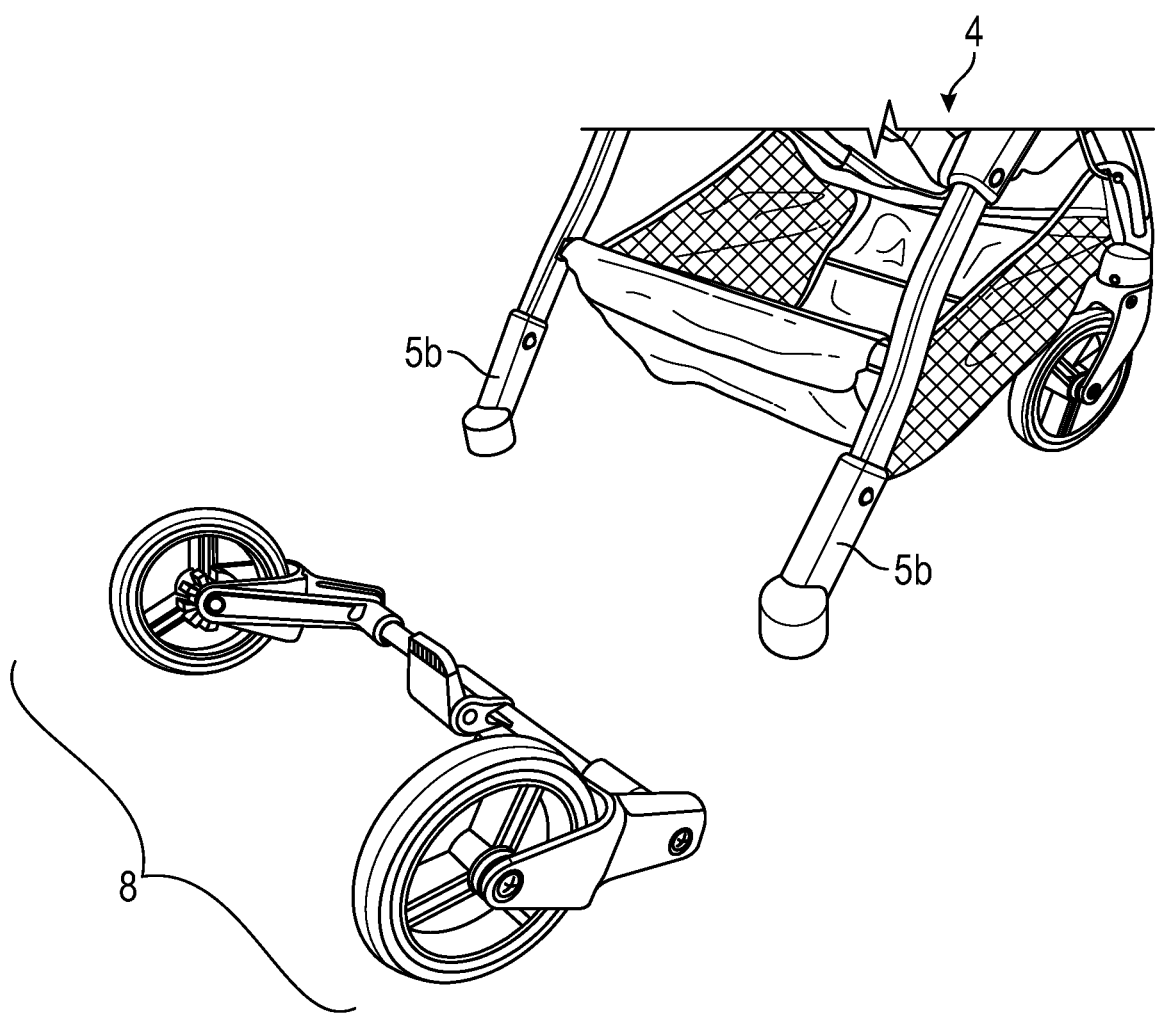
FIG. 3 illustrates the rear strut of the second buggy removed and sockets of the connection detail attached.
Figure 4:
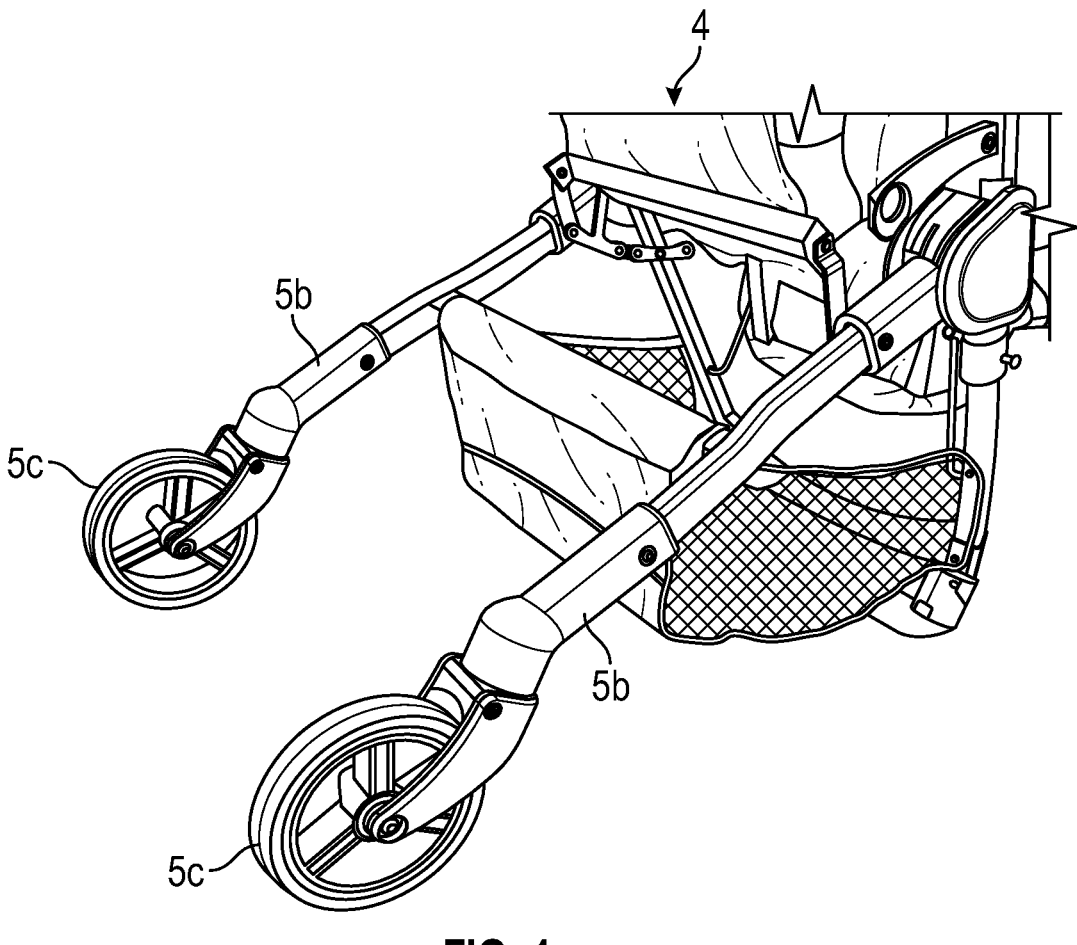
FIG. 4 illustrates wheels attached to the sockets of the connection detail of the second buggy.
Figure 5:
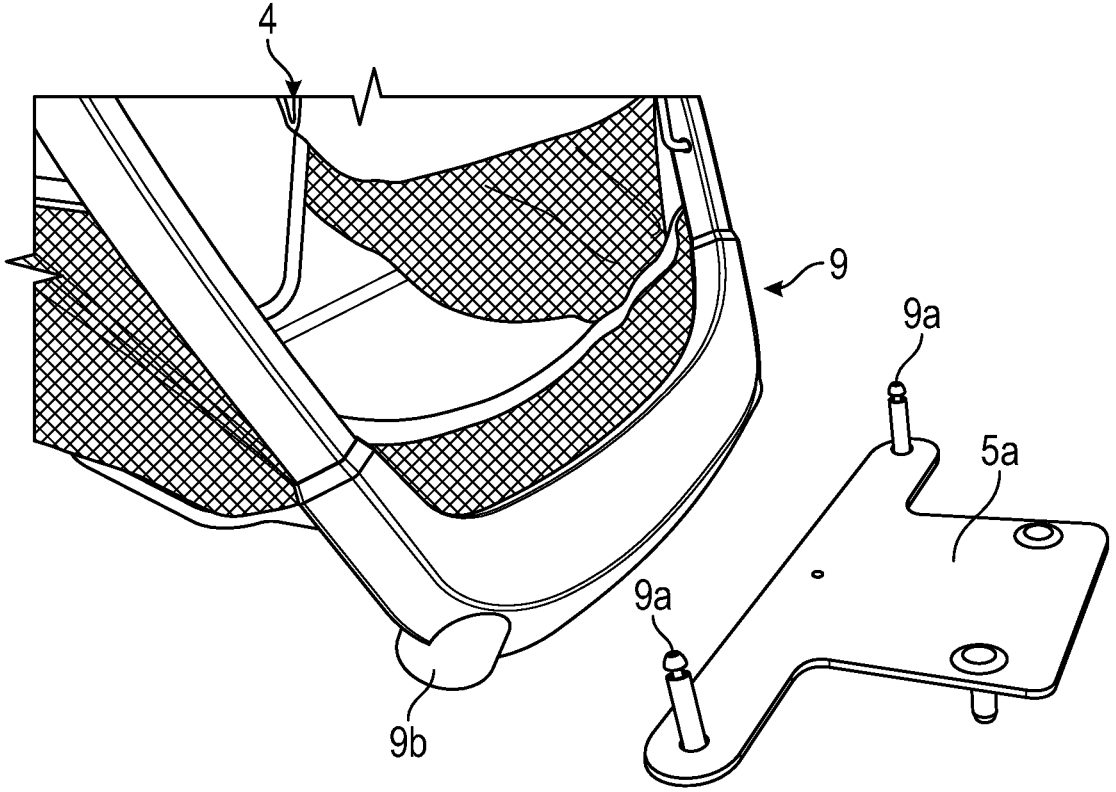
FIG. 5 illustrates the front of the second buggy and the linking member of the connection detail detached.
Figure 6:
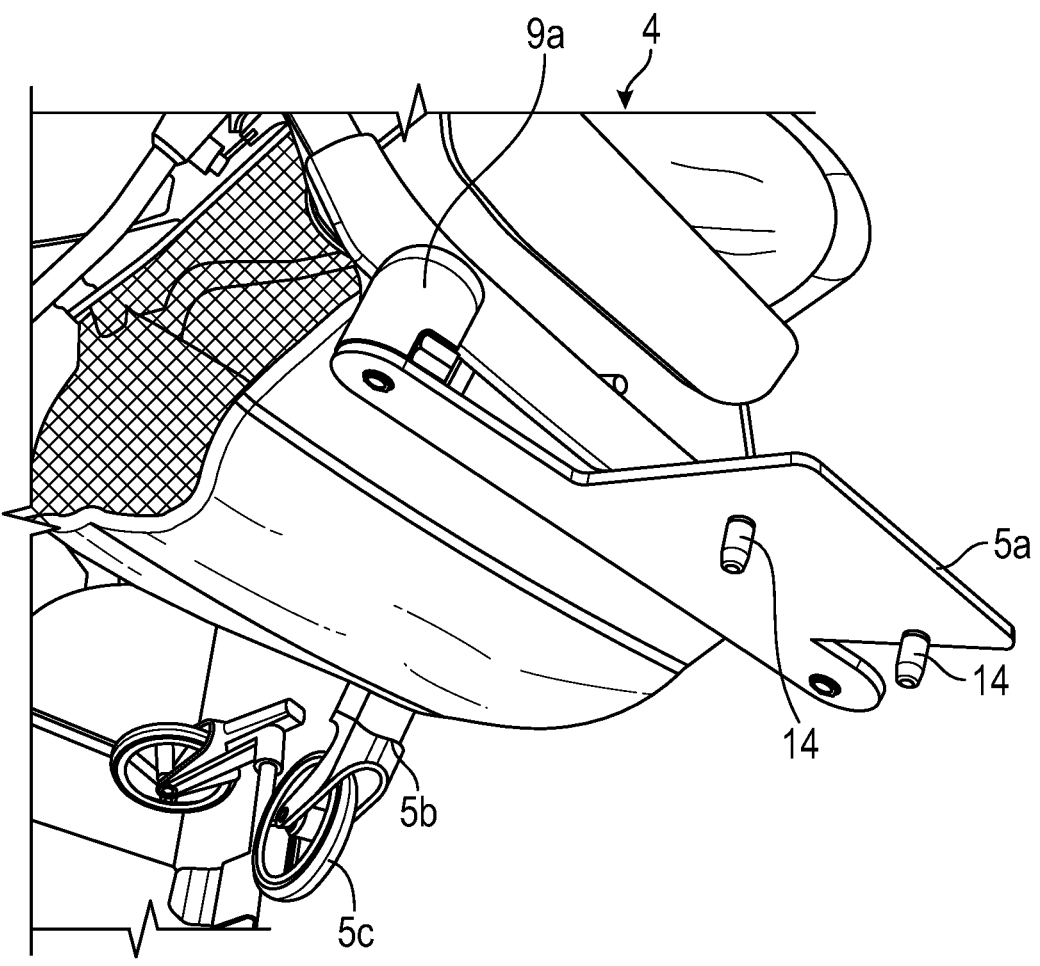
FIG. 6 illustrates the front of the second buggy and the linking member of the connection detail attached, the second buggy on its side.
Figure 7:
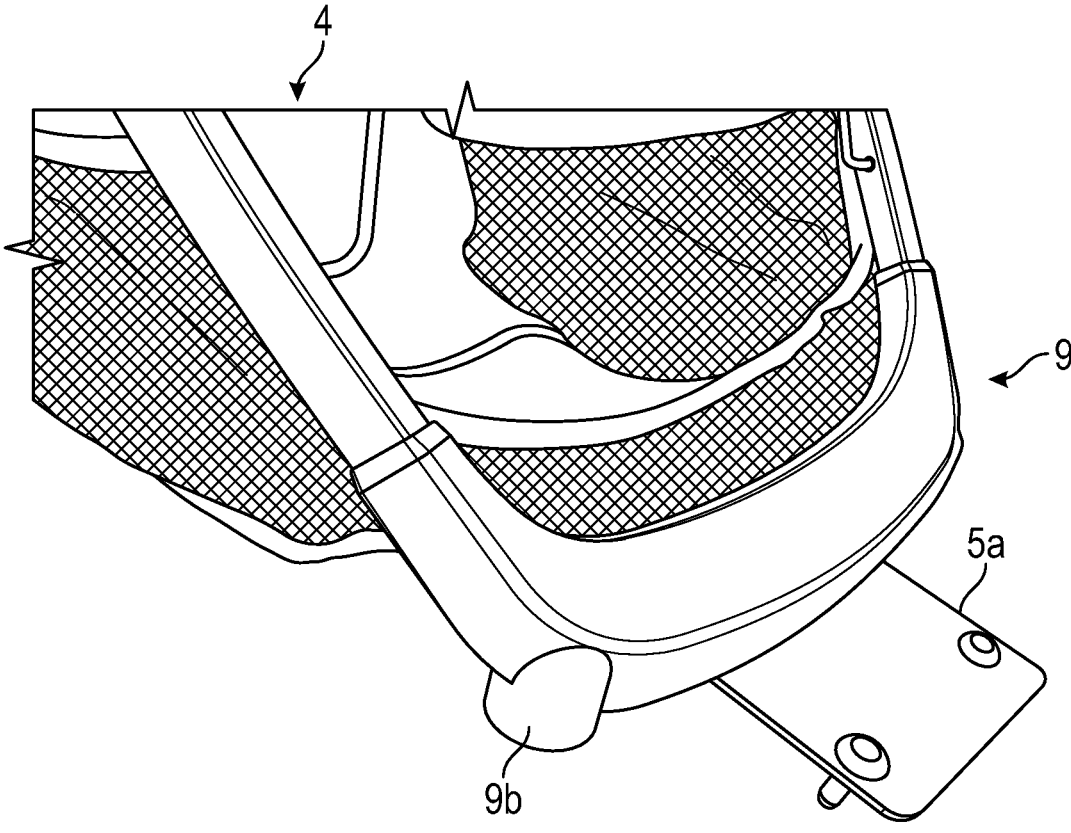
FIG. 7 illustrates the front of the second buggy and the linking member of the connection detail attached, the second buggy upright.

FIGS. 2-9 illustrate one example of a connection detail 5 that may be used to couple the first buggy 3 and second buggy 4. The connection detail 5 as shown comprises a linking member 5a and leg sockets 5b. The connection detail 5 may also comprise additional wheels 5c and a base section 10. FIG. 3 shows the rear strut and wheels 8 of the second or rear buggy 4 removed with the leg extension sockets 5b fitting to the second buggy 4 leg struts. FIG. 4 shows the additional wheels 5c attached to the leg extension sockets 5b. FIG. 5 shows a close up view of the front 9 of the second buggy 4 with the front wheels (not shown) removed and the front wheel socket 9b shown ready for insertion of the connection member rods 9a from the linking member 5a. The connection member rods 9a are retained into the front wheel sockets 9b and rigidly hold the linking member 5a in both a horizontal and vertical plane. FIG. 6 shows the second buggy 4 on its side to illustrate the underside of the linking member 5a when attached to the second buggy 4 front wheel sockets 9b. In FIG. 6, the connection member rods 9a are now inserted into the front wheel sockets 9b and are no longer visible. The linking member 5a has a plate that extends forwards of the second buggy 4. Towards the front of the linking member 5a are two second buggy connection members 14 that are rod shaped and extend downwards from the linking member 5a plate. FIG. 7 shows the second buggy 4 returned to a normal position, the linking member 5a now having the second buggy connection members 14 pointing downwards.

Figure 8:
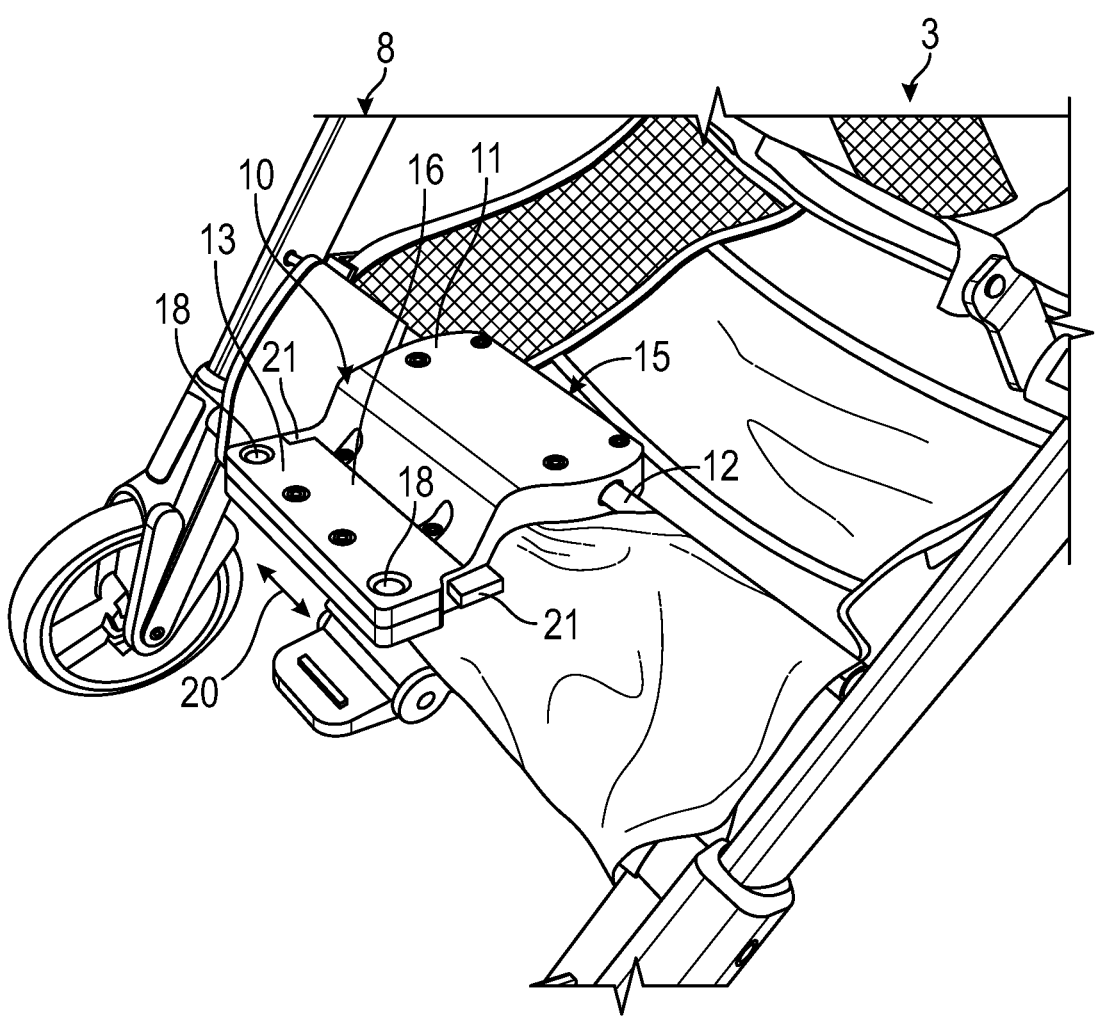
FIG. 8 illustrates the rear of the first buggy with a base section of the connection detail attached to the rear of the first buggy.
Figure 9:
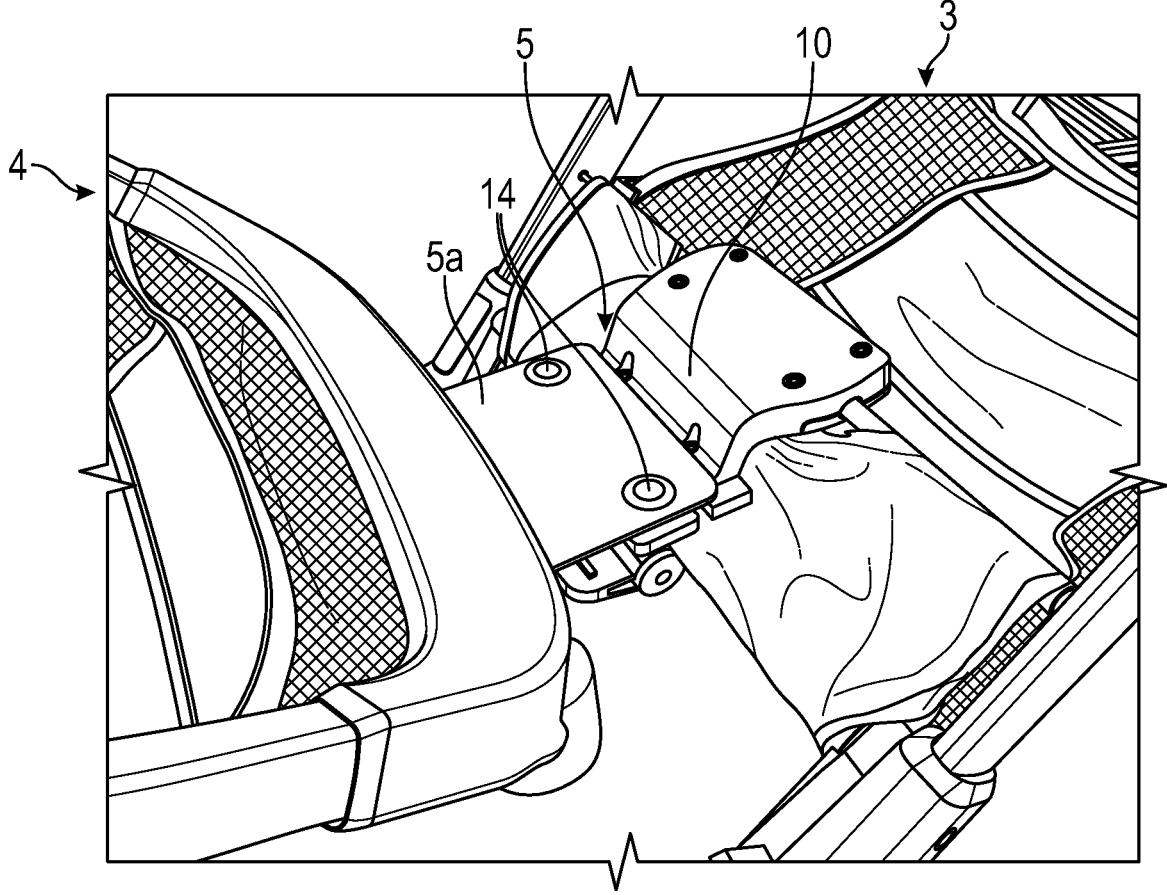
FIG. 9 illustrates a detail image of connection detail with the first and second buggies coupled together.

FIG. 8 shows the rear 8 of the first buggy 3 and a base section 10 attached to the fixing section or rear strut 12 of the first buggy 3. The base section 10 has a first end 11 that links to the first buggy 3 and a second end 13 that receives the second buggy linking members 14 (shown on earlier Figures). About the first end 11 of the base section 10 is a fixing section 15 to couple the base section 10 to the rear strut 12. The second end 13 comprises a further plate (not shown) inside the base section 10 that slides side to side about a horizontal plane 20 when actuated by buttons 21. The buttons 21 may be biased to move the plate to a position that interferes with the second buggy connection members 14 when the members 14 are in apertures 18 in the base section 10. FIG. 9 is a detail view of the first buggy 3 and second buggy 4 linked together via the connection detail 5. In this image, the linking member 5a second buggy connection members 14 are inserted into the apertures 18 (shown in FIG. 8) of the base section 10 and are held together by the further plate interfering with the connection members 14 and locking the connection members 14 within the apertures 18 (shown in FIG. 8) until the button(s) 21 are actuated.

As shown in the Figures, once coupled, the in-line tandem buggy 1 may be braked by use of the first buggy 3 brake(s). The brake mechanism of the second buggy 4 in the in-line tandem buggy 1 configuration is disconnected from the second buggy 4 (the rear strut). As a result, braking of the in-line tandem buggy 1 occurs using the brake mechanism on the first buggy 3. In the Figures, this is a foot activated brake located about the rear base of the first buggy 3 and the park brake is accessed from the side of the in-line tandem buggy 1. There is no link between a brake or brakes on the first 3 and second 4 buggies when in an in-line tandem buggy 1 configuration.

Aspects of the reconfigurable buggy have been described by way of example only and it should be appreciated that modifications and additions may be made thereto without departing from the scope of the claims herein.

The invention claimed is:

1. An in-line tandem buggy configured for carriage of two or more child seats, the in-line tandem buggy comprising:
   a first buggy configured for use alone to convey at least one child seat;
   a second buggy configured for use alone to convey at least one child seat; and
   a connection detail, the connection detail comprising:
   a linking member which comprises a plate,
   wherein the linking member further comprises, at one end of the plate of the linking member, connection member rods and the linking member further comprises, at an opposing end of the plate of the linking member, second buggy connection members; and
   a base section;
   wherein, when the first buggy and the second buggy are releasably coupled together via the connection detail:
   the second buggy connection members on one end of the linking member couple with the base section, the connection member rods on an opposing end of the plate of the linking member couple with the second buggy;
   the base section has a first end that engages the first buggy and a second end that couples to the plate of the linking member; and the first buggy being linked ahead of the second buggy via the connection detail, the coupled first buggy and the second buggy, combining to form the in-line tandem buggy.

2. The in-line tandem buggy as claimed in claim 1 wherein the first buggy or the second buggy comprises one or two child conveying seats.

3. The in-line tandem buggy as claimed in claim 1 wherein the first buggy and the second buggy are configured for use on their own in an un-linked manner when not coupled.

4. The in-line tandem buggy as claimed in claim 1 wherein the in-line tandem buggy is braked by use of brakes on the first buggy.

5. The in-line tandem buggy as claimed in claim 1 wherein the base section comprises a fixing section to couple the base section to the rear strut and further comprises therein, at the second end of the base section a further plate.

6. The in-line tandem buggy as claimed in claim 5 wherein the fixing section and the further plate therein have apertures there-between into which the second buggy connection members insert and are retained therein.

7. The in-line tandem buggy as claimed in claim 6 wherein the further plate and the second buggy connection members engage together to retain the second buggy connection members within the apertures.

8. The in-line tandem buggy as claimed in claim 7 wherein when the second buggy connection members are inserted into the recesses of the base section and, engagement occurs by the further plate interfering with the second buggy connection members and locking the second buggy connection members within the recesses.

9. The in-line tandem buggy as claimed in claim 7 wherein the further plate in the base section is movable in a horizontal plane relative to the base section and the fixing section.

10. The in-line tandem buggy as claimed in claim 9 wherein the further plate is movable from a second buggy connection member engaged position to a second buggy connection member non-engaged position.

11. The in-line tandem buggy as claimed in claim 9 wherein movement of the further plate relative to the base section and the second buggy linking members is urged via an actuator.

12. The in-line tandem buggy as claimed in claim 11 wherein the actuator comprises a bias means that biases the further plate to interfere with the second buggy connection members when the second buggy connection members are in the apertures of the base section.

13. The in-line tandem buggy as claimed in claim 1 wherein a rear strut and wheels of the second buggy are removed and replaced with leg extensions sockets and additional wheels fitted to the second buggy leg struts when the first buggy and the second buggy are coupled, the leg extension sockets and additional wheels configured to increase the height of a rear of the second buggy when in the in-line tandem buggy configuration to level the second buggy relative to the first buggy.

14. A method of coupling a first buggy and a second buggy to form an in-line tandem buggy by:
   providing the first buggy, the second buggy and the connection detail as claimed in claim 1; and
   coupling the first buggy and the second buggy together via the connection detail so as to form the in-line tandem buggy.

15. A method of un-coupling an in-line tandem buggy to a first buggy configuration and a second buggy configuration by:

providing the first buggy, the second buggy and the connection detail as claimed in claim 1; and un-coupling the connection detail so as to separate the in-line tandem buggy into the first buggy, the second buggy and the connection detail.

\* \* \* \* \*